United States Patent Office 2,815,272
Patented Dec. 3, 1957

2,815,272

METHOD OF PRODUCING TITANIUM CONCENTRATES

David L. Armant, Metuchen, N. J., and Harold S. Sigurdson, Indianapolis, Ind., assignors to National Lead Company, New York, N. Y., a corporation of New Jersey No Drawing. Application March 10, 1955, Serial No. 493,612

7 Claims. (Cl. 75—1)

This invention relates to titaniferous compositions of matter which react readily with strong mineral acids, particularly sulphuric acid, and to methods for preparing the same. This application is a continuation-in-part of our application Serial No. 363,383 filed June 22, 1953, now abandoned.

Industrial processes for the preparation of titanium dioxide pigments depend, in the first instance, upon a reaction between an iron-containing titaniferous material, ilmenite ore, and strong sulphuric acid. By means of this reaction which, in the trade, is generally termed "digestion" or "attack" the titanium and iron values, among others, are solubilized. The iron values play an important role in the process and are almost invariably removed after dissolution, as by crystallization. However, in the digestion reaction, they consume valuable acid which adds to the cost of producing the finished pigment.

Consequently, interest has developed in titaniferous compositions such as slags which contain a higher proportion of titanium than is usually present in ilmenite and relatively lower proportions of constituents like iron which consume valuable acid. Such slags are produced by smelting titaniferous ores in the presence of various fluxing agents. In producing such slags it has been found that the presence of appreciable quantities of alumina and silica normally produce viscous masses which are difficult to remove from the furnace unless the fluxing agents are employed in amounts greater than normal in order to satisfy the demand of the alumina and silica constituents. From such viscous masses it is difficult to separate the molten iron metal from the slag formed. When greater amounts of fluxing agents are employed the slags produced are lower in $TiO_2$ concentration than those produced from ores containing small amounts of alumina and silica constituents. It has further been found that titanium materials containing appreciable quantities of alumina and silica are difficult and sometimes impossible to digest in strong sulphuric acid due to the formation of bulky aluminum and silicon compounds which prevent the reaction of sulphuric acid and the titanium values to normally take place. The present invention provides methods for the preparation of novel titaniferous compositions which because of ready digestibility in strong sulphuric acid and relatively high titanium content are especially suited for the economical preparation of titanium dioxide pigments.

The principal object of the present invention is, therefore, the preparation of compositions or concentrates (from raw materials containing alumina and silica) rich in titanium and relatively poor in iron, which are readily digestible in strong sulphuric acid. Another object of the present invention is the preparation of slag compositions which when molten flow freely and are not viscous.

A still further object is to produce readily digestible titanium concentrates which do not contain excessive quantities of fluxing agents. These and other objects of the invention will be apparent from the following more complete description.

The compositions of the present invention are characterized broadly first as being readily digestible in strong sulphuric acid, the term "readily digestible" being hereinafter defined, and second, as having a small content of unreduced iron (iron oxide, FeO) but appreciably less total iron than contained in the original titaniferous iron starting material.

For the purposes of the present invention, the term "readily digestible" indicates a composition which, when subjected to a test, the conditions of which are about to be described, gives a yield of solubilized titanium, calculated as $TiO_2$, of at least 85% of the total titanium content ($TiO_2$ basis) of the composition.

TEST FOR DIGESTIBILITY

Ten grams of comminuted titaniferous material of fineness such as to substantially all pass through a 325 mesh screen were mixed with 65% sulphuric acid. The mixture was then heated to reaction temperature and held at 135° C. for three hours in order to dry out or cure the digestion cake. The amount of acid employed is sufficient to theoretically combine with the base forming elements, e. g. FeO, MgO, CaO and $Na_2O$ or $K_2O$ in the material and in addition to provide a ratio of $H_2SO_4$ to $TiO_2$ of 2.0 (assumed 96% solubilization of all reactable constituents). The cured cake was then dissolved in water or weak sulphuric acid. The content of the dissolved $TiO_2$ was determined by conventional analytical procedure.

The titaniferous compositions described in the appended claims as digestible in strong sulphuric acid when subjected to the foregoing test will show yields of solubilized $TiO_2$ of at least 85%. Preferred compositions will give yields of 90% or higher.

Compositions having the foregoing characteristics are obtained by the process of the instant invention which comprises admixing a titaniferous iron ore containing alumina and silica with an oxidic compound of sodium and/or potassium as a flux and a carbonaceous reducing agent. The mixture is heated to form molten iron metal and a titanium slag, the molten iron and titanium slag are separated from one another and the slag portion acid leached with dilute sulphuric acid to produce a digestible titanium concentrate. It has been found that the FeO in the slag before acid leaching should be present in amount from 1% to 10%.

When an oxidic compound of sodium is employed as fluxing agent, the slag before acid leaching should contain from about 17% to about 25% $Na_2O$. Potassium may be partially or wholly substituted on a mole basis for the sodium values employed. However for convenience, if potassium is wholly or partially employed as a fluxing agent, the $K_2O$ may be expressed on a $Na_2O$ weight basis by multiplying the $K_2O$ values by the factor 0.66. Therefore whether $Na_2O$ or $K_2O$ is employed alone or whether mixtures of the two agents are employed as fluxing agents, the amount of fluxing agents employed will be hereinafter expressed as the sum of the

$$Na_2O + 0.66 K_2O$$

The amount of the sum should lie somewhere from about 17% to about 25% of the slag on a weight basis. The amount of oxidic compound of sodium and/or potassium added as fluxing agent should be sufficient to produce in the slag amounts which fall within the following ratios by weight:

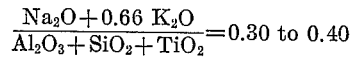
$$\frac{Na_2O + 0.66\ K_2O}{Al_2O_3 + SiO_2 + TiO_2} = 0.30 \text{ to } 0.40$$

when the $TiO_2$ content in the titaniferous iron ore is between 5% and 22% and 0.24 to 0.40 when the $TiO_2$ content in the titaniferous iron ore is above 22% and up to 50%.

When slags of this type are subsequently subjected to the dilute acid leaching treatment to remove the sodium, potassium, aluminum and silicon acid-soluble compound, the leached slag should contain a weight ratio of $$\frac{Na_2O + 0.66 \; K_2O}{TiO_2} = 0.16 - 0.24$$

to obtain the desirable digestibility, that is at least 85% solubilization of the titanium values present in the leached slag with sulphuric acid of at least 65% strength.

The titanium starting material used in the process of this invention preferably is a titaniferous iron ore. Titaniferous iron ores of various types have been employed. The titanium content of such ores varies widely. Ores containing as low as 5% $TiO_2$ and as high as 50% $TiO_2$ have been employed with equal success. Ores containing small amounts of $TiO_2$ which are particularly adaptable are those of the magnetite types, while ores containing higher amounts of $TiO_2$ are those of the ilmenite type.

Substantially all titaniferous iron ores contain various amounts of silica and alumina. These two particular constituents in the ores are normally difficult to process in slagging operations because of the viscous type melts which are formed upon high temperature treatment. Such viscous melts normally prevent clear separation of the slag from the molten metal and normally are difficult to remove from the furnace. It has been found by the instant invention, however, that the use of oxidic compounds of sodium and/or potassium added as fluxing agent fix the silica and alumina values in a form which permits a free flowing and fluid slag to be obtained during the heating step. Furthermore the sodium and/or potassium addition renders the silica and alumina values soluble in dilute sulphuric acid and therefore they are readily removed during a subsequent dilute acid leaching operation. By the term "oxidic" compounds of sodium and potassium, it is meant to include oxides, carbonates, hydroxides and other compounds which form oxides upon heating.

It has been found that if the amounts of sodium constituents are added within certain specified limits previously mentioned, the titanium values will remain in an insoluble form during the dilute acid leaching operation while a large portion of the silica and alumina constituents will be solubilized. This provides for a titanium concentrate to be produced which is low in both silica and alumina. Potassium oxidic compounds may also be added in place of sodium; the amounts of potassium added should be equivalent in moles to the amount of sodium which it replaces.

It has been found that the process should be carried out at temperatures between about 1200° C. and 1500° C. to obtain substantially complete reduction of the iron values. It is preferable however to carry out the smelting step at temperatures from 1250° C. to 1400° C. By smelting within the temperature range and using the fluxing agent previously described, a fluid, free-flowing slag is produced and both the silica and alumina constituents in the ore are fixed in the slag in a form in which they will be readily solubilized during a subsequent acid leaching operation.

In carrying out the process of the instant invention the titaniferous iron ore is admixed with the proper amount of fluxing agents and with a carbonaceous reducing agent, such as e. g. powdered carbon, coke or coal. The amount of carbonaceous reducing agent to be employed should be sufficient to reduce substantially all of the iron oxide values to metallic iron. The mixture is then heated to a temperature between 1200° C.–1500° C. until the iron content remaining in the slag portion is between 1% and 10% FeO. The amount of $Na_2O + 0.66 K_2O$ present in the slag should be between 17% and 25%. The amount of $Na_2O$ or $K_2O$ added will vary depending upon the amount of $TiO_2$ plus $SiO_2$ plus $Al_2O_3$ present in the titaniferous starting material. When the titanium dioxide content in the titaniferous iron ore is between 5% and 22%, the ratio of $$\frac{Na_2O + 0.66 \; K_2O}{Al_2O_3 + SiO_2 + TiO_2}$$

in the slag should be between about 0.30 and about 0.40. When the titanium dioxide content in the titaniferous iron ore is above 22% and up to 50% the ratio.

$$\frac{Na_2O + 0.66 \; K_2O}{Al_2O_3 + SiO_2 + TiO_2}$$

in the slag should be between 0.24 and 0.40.

The slag and molten iron metal formed as separate layers in the furnace are then separated from one another. The slag is then leached in dilute sulphuric acid to solubilize the sodium, potassium, aluminum and silicon acid-soluble values but not the titanium values and the leached slag is separated from the leach liquor. The acid-leached slag formed by the process of this invention should contain a ratio of $$\frac{Na_2O + 0.66 \; K_2O}{TiO_2}$$

of 0.16 to 0.24 and thereby is readily digestible in sulphuric acid of strength above 65% $H_2SO_4$.

In slagging operations it is difficult to maintain all of the sodium and/or potassium values in the mixture as the slagging operation proceeds. Usually a portion of the sodium or potassium content added as a fluxing agent is volatilized during the heating operation and therefore a portion is lost from the system. The amount of sodium or potassium content lost during the operation may vary widely with the individual furnace used. It is therefore necessary to take this loss factor into account when determining the amount of fluxing agents to be employed in the instant smelting operation. By minimum experimentation it is simple to determine the amount of sodium or potassium loss on the particular furnace to be employed and such loss is then compensated for in subsequent smelting runs.

In carrying out the acid leaching operation of the slag produced by the instant invention it has been found that satisfactory results have been obtained when dilute sulphuric acid is employed. The strength of sulphuric acid used preferably should be from 5% to 15%. The amount of sulphuric acid employed in the leaching operation should be in slight excess over the amount required to react with all of the sodium, and/or potassium, aluminum, silica and iron constituents. It is preferred to carry out the leaching operation at temperatures from 25° C. to 80° C. By carrying out the leaching operation within the preferred limits previously given it has been found that efficient leaching of the aluminum and silicon constituents will be obtained with a minimum of loss of titanium values.

In order to more fully illustrate the instant invention the following examples are presented to show typical operations employing various types of titaniferous iron ores using various amounts of fluxing agents.

*Example 1*

100 parts of ground titaniferous iron ore were dry blended with 15.4 parts of soda ash (9.0 part $Na_2O$) and 18 parts of coke. The ore had the following analysis:

| | Percent |
|---|---|
| $TiO_2$ | 22.0 |
| FeO | 35.2 |
| $Fe_2O_3$ | 32.4 |
| CaO | 0.9 |
| $SiO_2$ | 3.1 |
| $Al_2O_3$ | 4.2 |
| MgO | 2.2 |

The above mixture was charged into an arc furnace heated to 1400° C. and held at that temperature for 1 hour. The molten iron and the slag were separately tapped from the furnace. The slag produced was fluid and free-flowing.

The cooled slag was ground to substantially all minus 325 mesh (5%+325) and analyzed. The slag had the following analysis:

| | Percent |
|---|---|
| $TiO_2$ | 50.9 |
| FeO | 2.4 |
| $Na_2O$ | 21.3 |
| CaO | 2.3 |
| $SiO_2$ | 7.7 |
| $Al_2O_3$ | 9.9 |
| MgO | 5.5 |

It should be noted that the FeO content in the slag was 2.4%, the $Na_2O$ content 21.3% and the ratio $$\frac{Na_2O}{TiO_2+Al_2O_3+SiO_2}=0.31$$

The ground slag was then leached in 10% sulphuric acid for one hour at 75° C. with rapid stirring and the leach liquor was removed from the leached slag by filtration. The leached slag had the following analysis:

| | Percent |
|---|---|
| $TiO_2$ | 70.0 |
| FeO | 1.8 |
| $Na_2O$ | 13.5 |
| CaO | 3.7 |
| $SiO_2$ | 1.6 |
| $Al_2O_3$ | 1.8 |
| MgO | 7.6 |

It should be noted that in the leached slag the ratio of $$\frac{Na_2O}{TiO_2}=0.19$$

The leached slag was then digested in 70% sulphuric acid according to the digestion procedure given above and a $TiO_2$ recovery of 94.1% of the titanium values in the slag was recovered as soluble titanium.

The analysis of the slag before and after acid leaching, and the digestion recovery are recorded in Table 1.

*Example 2*

Another slag was prepared using the titaniferous iron ore shown in Example 1, in which a greater amount of soda ash was employed as a fluxing agent. Ground titaniferous ore (100 parts) was dry blended with 20 parts soda ash (11.8 parts $Na_2O$) and 18 parts of coke. The mixture was processed according to the procedure described in Example 1 and the results are recorded in Table 1.

*Example 3*

Another slag was prepared using titaniferous magnetite having the following analysis:

| | Percent |
|---|---|
| $TiO_2$ | 9.4 |
| FeO | 33.2 |
| $Fe_2O_3$ | 46.8 |
| CaO | 0.8 |
| $SiO_2$ | 2.8 |
| $Al_2O_3$ | 5.3 |
| MgO | 1.7 |

This ore was blended with 10.2 parts of soda ash (6.0 parts of $Na_2O$), and 22 parts of coke. The mixture was processed according to the procedure described in Example 1 and the results are recorded in Table 1.

*Example 4*

Another slag was prepared using a titaniferous iron ore having the following analysis:

| | Percent |
|---|---|
| $TiO_2$ | 19.3 |
| FeO | 30.8 |
| $Fe_2O_3$ | 25.4 |
| CaO | 2.2 |
| $SiO_2$ | 11.8 |
| $Al_2O_3$ | 7.2 |
| MgO | 3.3 |

This ore was blended with 20.5 parts of soda ash (12.0 parts $Na_2O$) and 18.0 parts coke. The ore was processed according to the procedure described in Example 1 and the results are recorded in Table 1.

*Example 5*

Another slag was prepared using ilmenite which had the following analysis:

| | Percent |
|---|---|
| $TiO_2$ | 45.3 |
| FeO | 38.8 |
| $Fe_2O_3$ | 5.8 |
| CaO | 1.0 |
| $SiO_2$ | 3.8 |
| $Al_2O_3$ | 2.1 |
| MgO | 3.2 |

This ore was blended with 25.6 parts of soda ash (15 parts $Na_2O$), and 15.0 parts coke. The mixture was processed according to the procedure described above and the results are recorded in Table 1.

*Example 6*

Again using the titaniferous iron ore shown in Example 1, another slag was prepared as a control sample in which a lesser amount of soda ash was employed as a fluxing agent. The ore was blended with 12.8 parts of soda ash (7.5 parts $Na_2O$) and 18 parts of coke. The mixture was processed according to the procedure described in Example 1. From Table 1 it should be noticed that the $$\frac{Na_2O}{TiO_2+Al_2O_3+SiO_2}$$

ratio in the slag was only 0.28 and the $$\frac{Na_2O}{TiO_2}$$

ratio of the leached slag was only 0.14.

The leached slag was then digested in 70% sulphuric acid according to the digestion procedure given above and only 58.0% of the titanium values in this control slag was digested and recovered as soluble titanium.

The analysis of the slag before and after acid leaching and digestion recovery are recorded in Table 1.

*Example 7*

In this example potassium carbonate was substituted for sodium carbonate as the fluxing agent. 100 parts of the same ore as that described in Example 1 were mixed with 20 parts of potassium carbonate and 18 parts of coke. The mixture was processed according to the procedure described in Example 1 to form a fluid free-flowing slag. The slag had the following analysis:

| | Percent |
|---|---|
| $TiO_2$ | 44.4 |
| FeO | 7.1 |
| $Na_2O$ | --- |
| $K_2O$ | 27.5 |
| CaO | 1.8 |
| $SiO_2$ | 6.3 |
| $Al_2O_3$ | 8.5 |
| MgO | 4.4 |

The FeO content as shown was 7.1% and the $K_2O$ content was 27.5%. The ratio $$\frac{0.66\ K_2O}{TiO_2+Al_2O_3+SiO_2}=0.31$$

The ground slag was leached in 5% $H_2SO_4$ for one-half hour at 30° C. The leached slag had the following analysis:

| | Percent |
|---|---|
| $TiO_2$ | 62.8 |
| FeO | 6.9 |
| $Na_2O$ | --- |
| $K_2O$ | 16.6 |
| CaO | 3.1 |
| $SiO_2$ | 1.8 |
| $Al_2O_3$ | 2.0 |
| MgO | 6.8 |

The ratio of $$\frac{0.66\ K_2O}{TiO_2}=0.18$$

The leached slag was digested according to the procedure described in Example 1 and the analysis of the slag before and after acid leaching and the digestion recovery are recorded in Table 2.

*Example 8*

Another slag was prepared from the same ore as was used in Example 1 except that a mixture of 10 parts of $K_2CO_3$ and 7.7 parts of sodium carbonate was added as the fluxing agent. The same procedure as that used in Example 7 was employed. The results are recorded in Table 2.

*Example 9*

Another slag was prepared from the ore described in Example 5 by employing 33.5 parts of potassium carbonate as fluxing agent. The results are also recorded in Table 2.

*Example 10*

Using 16.8 parts of $K_2CO_3$ and 12.8 parts of $Na_2CO_3$ as fluxing agents, a slag was prepared from the ore described in Example 5. The results are also recorded in Table 2.

TABLE 1

| | Examples | | | | | |
|---|---|---|---|---|---|---|
| | 1 | 2 | 3 | 4 | 5 | 6 |
| Slag, percent: | | | | | | |
| $TiO_2$ | 50.9 | 48.7 | 33.8 | 33.6 | 64.6 | 52.4 |
| FeO | 2.4 | 2.2 | 2.6 | 2.8 | 3.2 | 1.8 |
| $Na_2O$ | 21.3 | 24.1 | 20.5 | 19.7 | 17.8 | 19.8 |
| CaO | 2.3 | 3.6 | 3.1 | 5.3 | 1.4 | 2.7 |
| $SiO_2$ | 7.7 | 7.8 | 12.7 | 20.4 | 5.4 | 8.3 |
| $Al_2O_3$ | 9.9 | 8.8 | 21.4 | 12.1 | 3.1 | 10.2 |
| MgO | 5.5 | 4.8 | 5.9 | 6.1 | 4.5 | 4.8 |
| $\frac{Na_2O}{TiO_2+Al_2O_3+SiO_2}=$ | 0.31 | 0.37 | 0.30 | 0.30 | 0.24 | 0.28 |
| Leached Slag, percent: | | | | | | |
| $TiO_2$ | 70.0 | 68.8 | 63.3 | 67.5 | 75.5 | 70.5 |
| FeO | 1.8 | 1.0 | 1.4 | 1.9 | 1.8 | 1.4 |
| $Na_2O$ | 13.5 | 16.4 | 10.1 | 11.6 | 13.9 | 9.9 |
| CaO | 3.7 | 4.8 | 5.4 | 9.6 | 2.3 | 3.6 |
| $SiO_2$ | 1.6 | 1.3 | 1.5 | 2.9 | 1.1 | 3.2 |
| $Al_2O_3$ | 1.8 | 1.4 | 8.3 | 0.8 | 0.6 | 3.2 |
| MgO | 7.6 | 6.3 | 10.0 | 5.7 | 4.8 | 8.2 |
| $\frac{Na_2O}{TiO_2}=$ | 0.19 | 0.24 | 0.16 | 0.17 | 0.18 | 0.14 |
| Digestion (70% $H_2SO_4$): | | | | | | |
| Percent $TiO_2$ Solubilization | 94.1 | 95.6 | 85.2 | 88.5 | 93.0 | 58.0 |

TABLE 2

| | Examples | | | |
|---|---|---|---|---|
| | 7 | 8 | 9 | 10 |
| Slag, percent: | | | | |
| $TiO_2$ | 44.4 | 48.5 | 56.4 | 60.1 |
| FeO | 7.1 | 3.7 | 2.7 | 1.3 |
| $Na_2O$ | --- | 9.9 | --- | 10.0 |
| $K_2O$ | 27.5 | 15.0 | 28.4 | 15.2 |
| CaO | 1.8 | 2.0 | 1.2 | 1.3 |
| $SiO_2$ | 6.3 | 6.8 | 4.7 | 5.0 |
| $Al_2O_3$ | 8.5 | 9.2 | 2.6 | 2.8 |
| MgO | 4.4 | 4.9 | 4.0 | 4.3 |
| $\frac{Na_2O+0.66\ K_2O}{Al_2O_3+SiO_2+TiO_2}=$ | 0.31 | 0.31 | 0.29 | 0.29 |
| Leached Slag, percent: | | | | |
| $TiO_2$ | 62.8 | 70.0 | 71.1 | 75.6 |
| FeO | 6.9 | 2.3 | 1.7 | 0.4 |
| $Na_2O$ | --- | 5.3 | --- | 6.0 |
| $K_2O$ | 16.6 | 8.9 | 18.6 | 9.3 |
| CaO | 3.1 | 3.2 | 2.1 | 2.4 |
| $SiO_2$ | 1.8 | 1.5 | 1.0 | 1.2 |
| $Al_2O_3$ | 2.0 | 2.2 | 1.1 | 0.6 |
| MgO | 6.8 | 6.6 | 4.4 | 4.5 |
| $\frac{Na_2O+0.66\ K_2O}{TiO_2}=$ | 0.18 | 0.16 | 0.17 | 0.16 |
| Digestion (70% $H_2SO_4$): | | | | |
| Percent $TiO_2$ Solubilization | 91.6 | 93.5 | 94.3 | 94.2 |

It has clearly been shown by the description of the instant invention and by the examples presented that readily digestible titanium concentrates may be prepared from raw materials containing alumina and silica. Such concentrates are rich in titanium values and relatively poor in alumina and silica. By the process of the instant invention the alumina and silica constituents which normally are difficult and sometimes substantially impossible to handle, are fixed in the slag, by the addition of oxidic compounds of sodium and/or potassium as fluxing agents in forms which are easily removed by a subsequent acid leaching operation. The amount of oxidic compound of sodium and/or potassium added as fluxing agents is carefully controlled within specified limits in order to selectively solubilize the aluminum and silicon constituents in a subsequent acid leaching step without solubilizing the titanium values. Slags prepared using oxidic compounds of sodium and/or potassium within the specified limits from free-flowing and non-viscous slags. Such free-flowing slags provide efficient and effective separations of the slag and molten iron portions. Such slags are easy to handle and economical to process. The titanium concentrate formed by the instant invention contains small amounts of residual iron, aluminum and silicon constituents thereby providing for a titanium concentrate high in $TiO_2$ content.

While this invention has been described and illustrated by the examples shown, it is not intended to be strictly limited thereto and other modifications and variations may be employed within the scope of the following claims.

We claim:

1. A method for producing a digestible concentrate from titaniferous iron ore containing compounds of aluminum and silicon which comprises admixing said ore with a carbonaceous reducing agent and the only fluxing agent added, a compound selected from the group consisting of an oxidic compound of sodium, an oxidic compound of potassium and mixtures thereof, heating said admixture to form a slag and molten iron at a temperature between 1200° C. and 1500° C. until the FeO content of said slag is reduced to between 1% and 10%, the amount of said fluxing agent present in said mixture being sufficient to produce a slag which contains from about 17% to 25% ($Na_2O+0.66\ K_2O$ and in which the weight ratio $$\frac{Na_2O+0.66\ K_2O}{Al_2O_3+SiO_2+TiO_2}=0.30\ to\ 0.40$$

when the $TiO_2$ content in the titaniferous iron ore is between 5% and 22% and 0.24 to 0.40 when the $TiO_2$ content in the titaniferous iron ore is above 22% and up to 50%, leaching said slag with dilute sulphuric acid to remove the sodium, potassium, aluminum and silicon acid-soluble compounds, the titanium values remaining in insoluble form in said slag during said leaching operation and to produce a leached slag in which the weight ratio $$\frac{Na_2O + 0.66\ K_2O}{TiO_2} = 0.16\ \text{to}\ 0.24$$

and separating the leach liquor from the leached titanium slag.

2. Method according to claim 1 in which said mixture is heated at a temperature of 1250° C. to 1400° C.

3. Method according to claim 1 in which the slag is leached with sulphuric acid of strength between 5% and 15%.

4. Method according to claim 1 in which the slag is leached with dilute acid at temperature between 25° C. and 80° C.

5. Method according to claim 1 in which the fluxing agent is oxidic compound of sodium.

6. Method according to claim 1 in which the fluxing agent is oxidic compound of potassium.

7. Method according to claim 1 in which the fluxing agent is a mixture of oxidic compounds of both sodium and potassium.

References Cited in the file of this patent

UNITED STATES PATENTS

| | | |
|---|---|---|
| 2,375,268 | Wyckoff | May 8, 1945 |
| 2,453,050 | Turbett | Nov. 2, 1948 |
| 2,471,242 | Royster | May 24, 1949 |
| 2,476,453 | Pierce et al. | July 19, 1949 |
| 2,537,229 | McLaren | Jan. 9, 1951 |
| 2,631,941 | Cole | Mar. 17, 1953 |

FOREIGN PATENTS

| | | |
|---|---|---|
| 26,777 | Great Britain | of 1910 |
| 251,527 | Great Britain | May 6, 1926 |

OTHER REFERENCES

The Mining Journal, July 25, 1952, vol. 239, pages 95–96.

Bureau of Mines Report of Investigation 4902, "Treatment of Titaniferous Magnetite Ore . . .," published by U. S. Dept. of Interior, August 1952, 17 pages.